United States Patent
Pauly et al.

(10) Patent No.: US 10,534,517 B2
(45) Date of Patent: Jan. 14, 2020

(54) MEASURING DEVICE AND METHOD FOR OPERATING A MEASURING DEVICE USING TRANSPARENT DISPLAY CONTENT

(71) Applicant: Rohde & Schwarz GmbH & Co. KG, Munich (DE)

(72) Inventors: Andreas Pauly, Munich (DE); Thomas Braunstorfinger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 547 days.

(21) Appl. No.: 14/312,238

(22) Filed: Jun. 23, 2014

(65) Prior Publication Data

US 2015/0309699 A1    Oct. 29, 2015

Related U.S. Application Data

(60) Provisional application No. 61/984,164, filed on Apr. 25, 2014.

(51) Int. Cl.
*G06F 3/048* (2013.01)
*G06F 3/0484* (2013.01)
*G06F 3/0482* (2013.01)

(52) U.S. Cl.
CPC ........ *G06F 3/04842* (2013.01); *G06F 3/0482* (2013.01); *G06F 2203/04804* (2013.01)

(58) Field of Classification Search
CPC ......... G06F 2203/04804; G06F 3/0412; G06F 3/0416; G06F 3/0482; G06F 3/04886; G06F 3/041; G06F 3/04842; G06F 2203/04803; G06F 3/048

USPC ........................................................ 715/768
See application file for complete search history.

(56) References Cited

U.S. PATENT DOCUMENTS

| | | | | |
|---|---|---|---|---|
| 5,949,432 A | * | 9/1999 | Gough | G06F 3/0481 345/629 |
| 2003/0001899 A1 | * | 1/2003 | Partanen | G06F 3/0481 715/800 |
| 2006/0221078 A1 | * | 10/2006 | Ishizuka | G01R 31/31912 345/440 |
| 2007/0226642 A1 | * | 9/2007 | Soulier | G06F 3/0486 715/768 |
| 2013/0104065 A1 | * | 4/2013 | Stecher | G06F 3/0481 715/767 |

OTHER PUBLICATIONS

R&S ZNC Vector Network Analyzer—Solid performance on a future-oriented platform, Product Brochure 2.00, Rohde&Schwarz, ZNC_Pro_en_5214-5610-12-v0200.indd 1, Mar. 7, 2012.

* cited by examiner

*Primary Examiner* — Phuong H Nguyen
(74) *Attorney, Agent, or Firm* — Potomac Technology Law, LLC

(57) ABSTRACT

A measuring device comprises a control unit, a display unit and an input unit. The control unit is configured to control the display unit to display a first content in a first display area and a second content in a second display area. The input unit is configured to allow a user to select one of the first display area, the second display area and no display area. The control unit is then configured to display the first content at least partially transparent, when the first display area is selected, and to display the second content at least partially transparent, when the second display area is selected.

10 Claims, 5 Drawing Sheets

MEASURING DEVICE AND METHOD FOR OPERATING A MEASURING DEVICE USING TRANSPARENT DISPLAY CONTENT

RELATED APPLICATIONS

This application claims the benefit of the earlier filing date under 35 U.S.C. § 119(e) of U.S. Provisional Application Ser. No. 61/984,164 (filed 2014 Apr. 25).

TECHNICAL FIELD

The invention relates to a measuring device and a method for operating a measuring device at least partially displaying content transparently on a display unit.

BACKGROUND

Conventional measuring devices are often controlled by use of a screen and an input device, such as a mouse or a touch sensitive surface of the screen. Information is than displayed on this screen. In order to control the measuring device, the user uses the input device to interact with the information displayed on the screen. Since the screen size is limited, also the amount of information, which can be displayed at the same time, is limited. This problem has been partially solved by allowing a switching between different sets of information content on the screen. This though creates a new problem. When switching between different content sets, the information present in the presently not viewed content set is not accessible.

Moreover, the product information "R&S ZNC Vektor-Netzwerkanalysator Solide Performance auf zukunfts-weisender Plattform" (R&S ZNC Vector Network Analyzer Solid Performance on Future-Oriented Platform) shows a network analyzer, which uses a display and an input unit for controlling the network analyzer as explained above.

The solution shown by the state of the art is disadvantageous, since the measuring devices shown there, do not allow displaying large amounts of information at the same time. This leads to a low usage efficiency.

What is needed, therefore, is a measuring device and a method for operating a measuring device, which allow a very efficient interaction with the measuring device.

SOME EXAMPLE EMBODIMENTS

Embodiments of the present invention advantageously address the foregoing requirements and needs, as well as others, by providing a measuring device and a method for operating a measuring device, which allow a very efficient interaction with the measuring device.

An inventive measuring device comprises a control unit, a display unit and an input unit. The control unit is configured to control the display unit to display a first content in a first display area and a second content in a second display area. The input unit is configured to allow a user to select one of the first display area, the second display area and no display area. The control unit is then configured to display the first content at least partially transparent, when the first display area is selected, and to display the second content at least partially transparent, when the second display area is selected. As soon as a user selects one of the display areas, the content displayed within this display area is therefore displayed at least partially transparent. This allows the user to see the content of the selected display area and the content of the underlying display area at the same time.

Advantageously, the first display area and the second display area at least partially overlap. The control unit is then configured to display the first content in front of the second content when the first display area is selected and the display the second content in front of the first content when the second display area is selected. By selecting one display area, not only the content to be displayed transparently is selected, but also the order of content on the display is chosen. This further increases usage efficiency.

Moreover, advantageously, the input unit is a mouse or a trackball or a track-pad. The input unit is then configured to allow a user to select one of the first display area and the second display area by moving a cursor on the display unit by use of the mouse or trackball or track-pad and pressing a button of the mouse or trackball or track-pad when the cursor is within the respective display area. Very low-cost standard components can therefore be used.

Alternatively, the input unit can be a touchscreen. The input unit is then configured to allow a user to select one of the first display area and the second display area by touching the respective display area. A very intuitive use of the measuring device can thereby be achieved.

Advantageously, the first content is displayed 30%-70% transparent, more advantageously 40%-60% transparent, if the first display area is selected. Moreover, advantageously, the second content is displayed 30%-70% transparent, more advantageously 40%-60% transparent, if the second display area is selected. By use of these degrees of transparency, the first image content and the second image content are easily readable at the same time.

Advantageously, the input unit is configured to detect a move-action indicating a wish of the user to move a respective content of a selected display area on the display unit. The control unit is then configured to move the respective content of the selected display area on the display unit, when the input unit detects the move-action. The control unit is then furthermore configured to display the respective content transparent, while moving the respective content of the selected display area on the display unit. Especially, if the first content and the second content are measuring curves, it is thereby very easily possible to compare the curves by moving one curve relative to the other. Also the readability can be increased by moving the content.

Advantageously, the first content and the second content control dialogs and/or measurement results and/or input parameters and/or measurement curves and/or output parameters and/or settings and/or input curves. A high flexibility can thereby be achieved.

An inventive method for operating a measuring device comprising a display unit, comprises displaying a first content in a first display area and displaying a second content in a second display area, selecting by a user one of the first display area, the second display area and no display area, displaying the first content transparent, when the first display area is selected, and displaying the second content transparent, when the second display area is selected. A very easy use of the measuring device can thereby be achieved.

BRIEF DESCRIPTION OF THE DRAWINGS

These and other features, aspects and advantages of the present invention will become better understood with regard to the following description, appended claims and accompanying drawings where:

DETAILED DESCRIPTION

Figure 1:
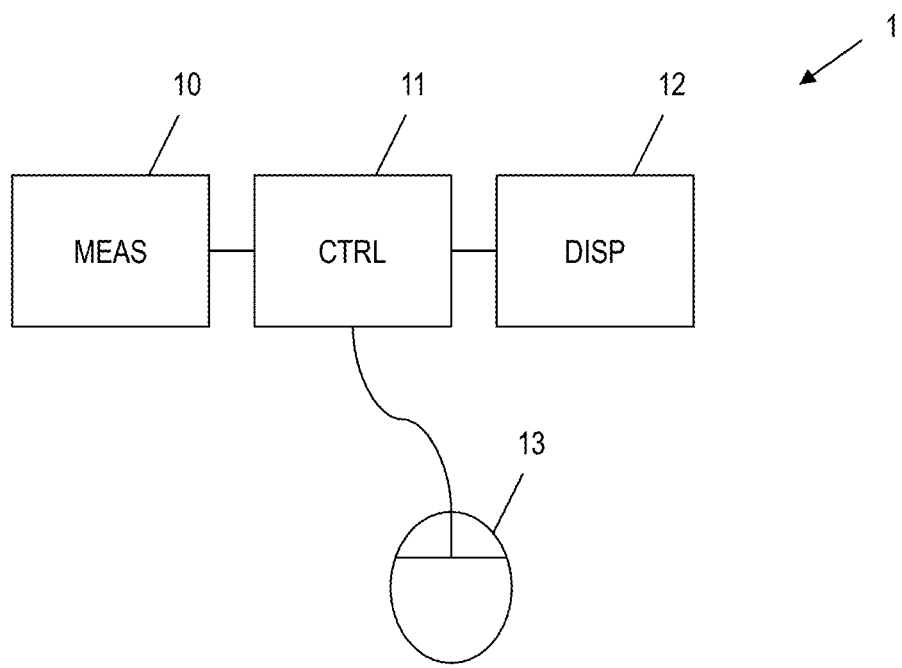
FIG. 1 illustrates a block diagram depicting a measuring device, in accordance with example embodiments of the present invention.
Figure 2:
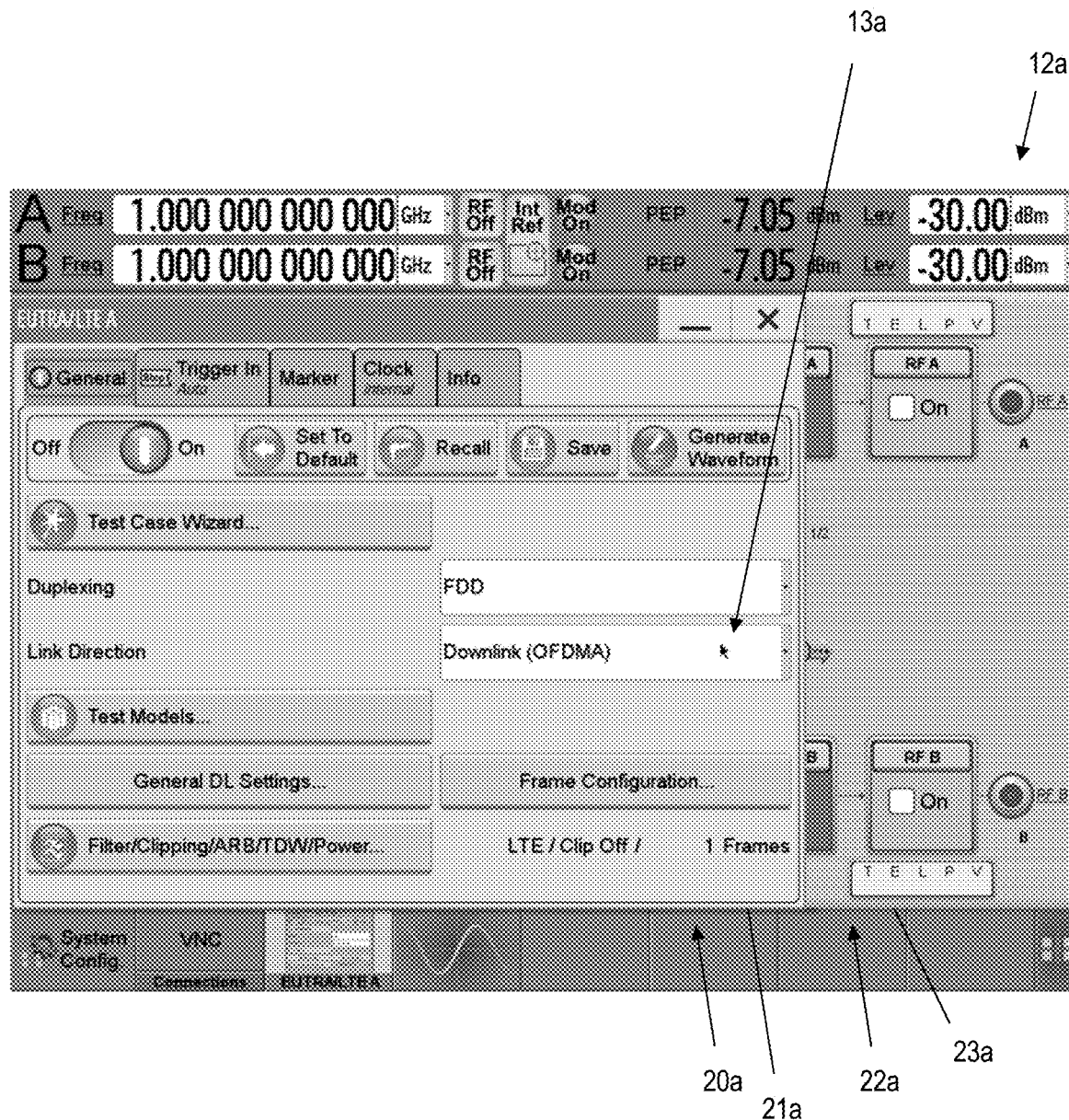
FIG. 2 illustrates a first example of the display content of a display unit of a measuring device, in accordance with example embodiments of the present invention.
Figure 3:
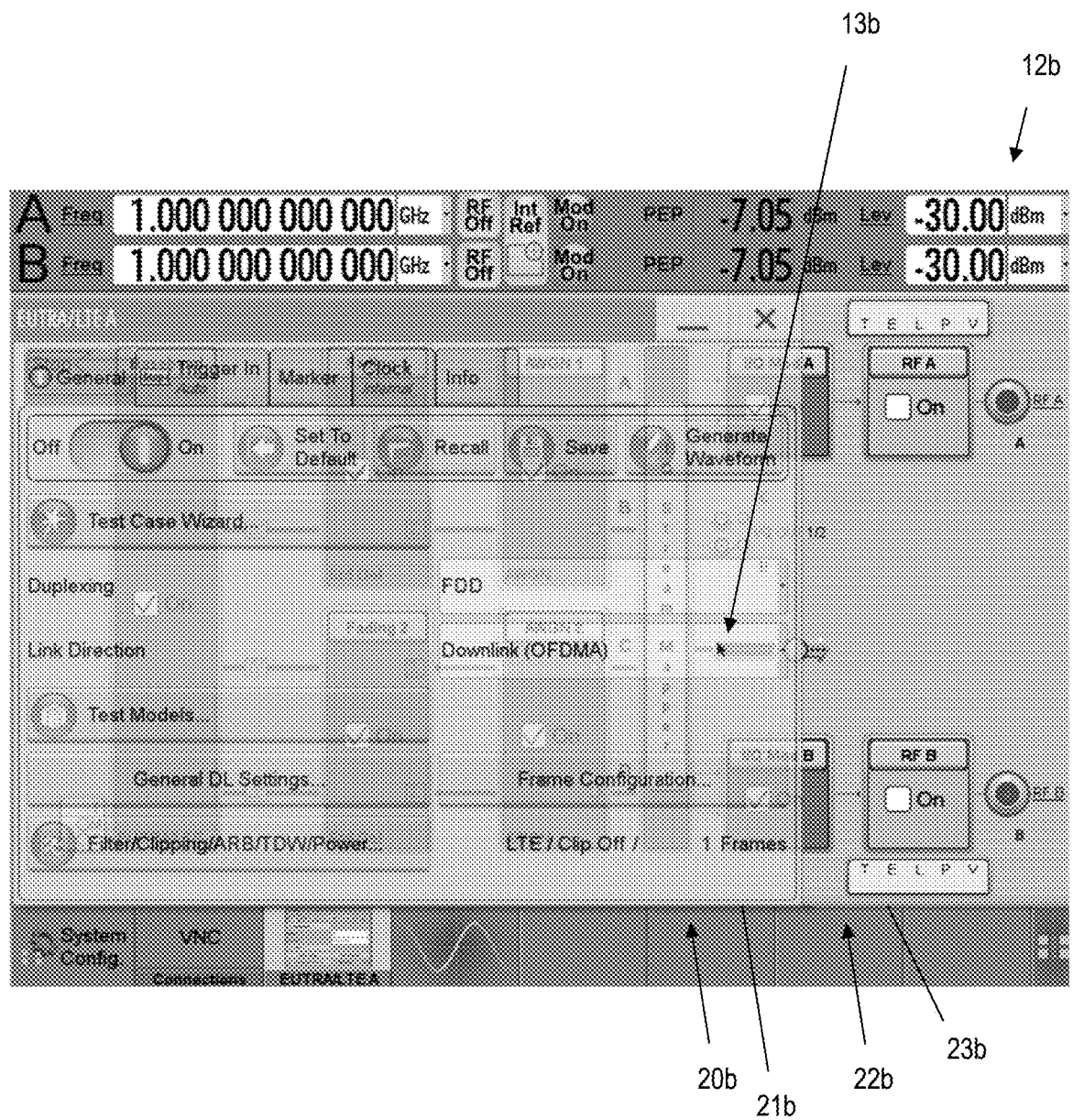
FIG. 3 illustrates a second example of the display content of a display unit of a measuring device, in accordance with example embodiments of the present invention.
Figure 4:
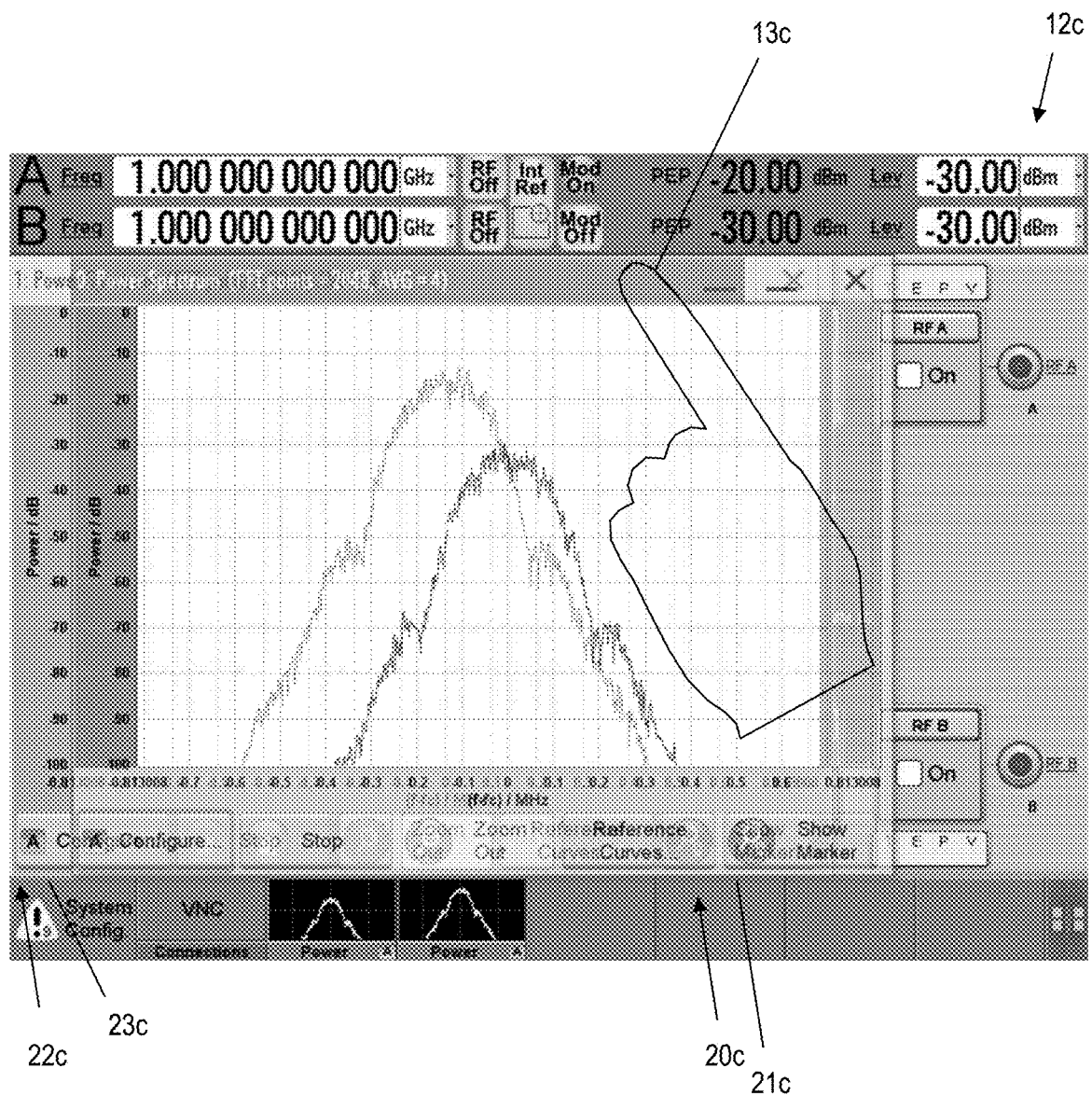
FIG. 4 illustrates a third example of the display content of a display unit of a measuring device, in accordance with example embodiments of the present invention.

With reference to FIG. 1, first, the general construction and function of a measuring device in accordance with example embodiments is described. With reference to FIGS. 2-4, details of the functioning with respect to the measuring device inputs and display in accordance with example embodiments are then described. Further, with reference to FIG. 5, the operation of a measuring device in accordance with example embodiments is described.

Reference will now be made in detail to preferred embodiments of the present invention, examples of which are illustrated in the accompanying drawings. However, the following embodiments of the present invention may be variously modified at the range of the present invention is not limited by the following embodiments.

FIG. 1 illustrates a block diagram depicting a measuring device, in accordance with example embodiments of the present invention. The measuring device 1 comprises a measuring unit 10, connected to a control unit 11, which again is connected to a display unit 12 and to an input unit 13.

The measuring unit 10 performs measurements under the control of the control unit 11. The control unit 11 controls the display unit 12 to display measuring results and user dialogs. The input unit 13 is used for interacting with the measuring device 1, for example by moving a cursor on the display unit 12. The inputs of the input unit 13 are handled by the control unit 11.

FIG. 2 illustrates a first example of the display content of a display unit of a measuring device, in accordance with example embodiments of the present invention. The display unit 12a corresponds to the display unit 12 of FIG. 1. In this example, within a first display area 20a, a first content 21a is displayed, as also reflected by Step 100 of FIG. 5. Here, the first content 21a is a user dialog for selecting parameters. Within the second display area 22a, a number of function blocks showing the setup of the measuring device are shown. Moreover, in a second display area 22a, a second content 23a is displayed, as also reflected by Step 101 of FIG. 5. In this example, a cursor 13a, which is for example a mouse arrow of the input unit 13 of FIG. 1 is shown within the first display area 20a.

Figure 5:
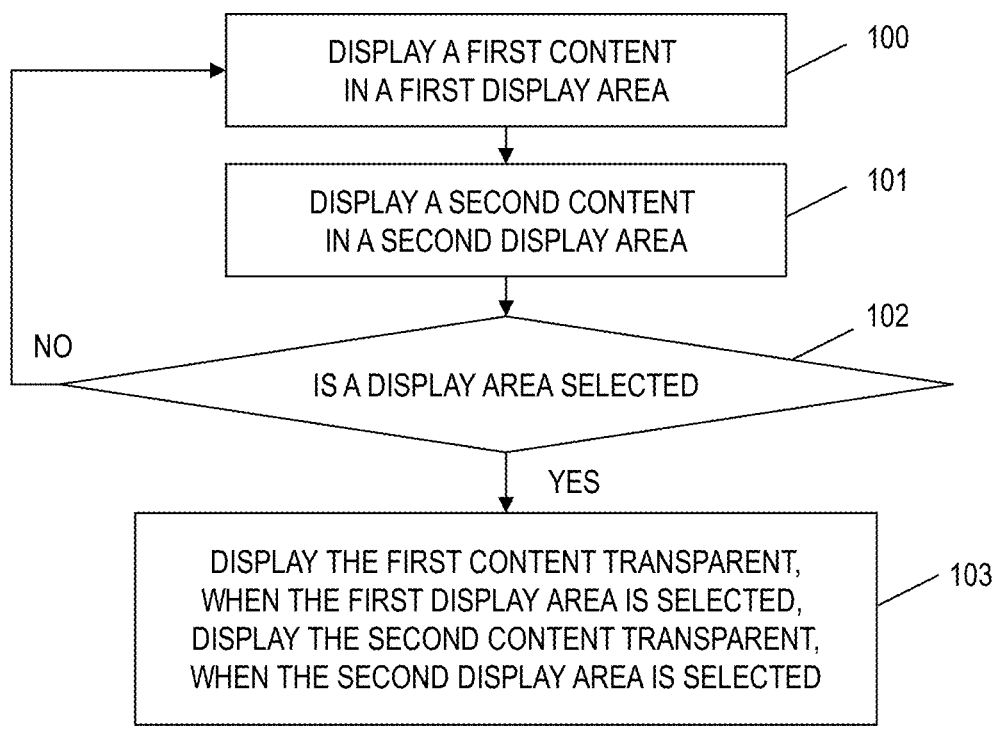
FIG. 5 illustrates a flow chart depicting a method of operating a measuring device, in accordance with example embodiments of the present invention.

Here, neither the first display area 20a nor the second display area 22a is selected by the user, as reflected by the "NO" path of Step 102 of FIG. 5. Therefore, no content is displayed transparently.

FIG. 3 illustrates a second example of the display content of a display unit of a measuring device, in accordance with example embodiments of the present invention. The display unit 12b corresponds to the display unit 12 of a FIG. 1. Also here, within a first display area 20b, a first content 21b is depicted, as also reflected by Step 100 of FIG. 5. Within a second display area 22b, a second content 23b is depicted, as also reflected by Step 101 of FIG. 5. A cursor 13b, which is for example a mouse-arrow corresponding to the input unit 13 of FIG. 1 is shown within the first display area 20b.

In this example, the user has selected the first display area 20b, for example by clicking the mouse while the cursor 13b is within the first display area 20b. Selecting the first display area 20b has led to the first content 21b being displayed at least partially transparently, as also reflected by the "YES" path of Step 102 and Step 103 of FIG. 5. Within the first display area 20, the first content 21b and at the same time, the second content 23b is visible. As soon as the user un-selects, the first display area 20b, for example by releasing the mouse button, the first content 21b again is displayed at least partially transparently, as depicted in FIG. 3.

FIG. 4 illustrates a third example of the display content of a display unit of a measuring device, in accordance with example embodiments of the present invention. Here, the content of a display unit 12c, which corresponds to the display unit 12 of FIG. 1 is shown. The display unit 12c shows a first display area 20c and a first content 21c, as also reflected by Step 100 of FIG. 5. The first content 21c here is a measurement curve. Moreover, the display unit 12c shows a second display area 22c and a second content 23c, as also reflected by Step 101 of FIG. 5. Also the second content 23c is a measurement curve. Moreover, a user hand 13c is displayed touching the first display area 20c. In this example, the input unit is a touchscreen. By touching the first display area 20c, the user has selected the first display area 20c and the first content 21c is displayed at least partially transparently, as also reflected by the "YES" path of Step 102 and Step 103 of FIG. 5.

In addition to displaying the content within a display area selected by the user transparently, also the order of display content on the display unit can be amended by the selection of the user. In this case, as soon as an image area is selected by the user, the content displayed within this image area is moved to the front. Further content in other display areas is displayed behind the content of the selected display area.

Advantageously, the transparency is 30%-70%, more advantageously 40%-60%.

Also, display areas can be moved on the display unit by selecting the respective display area, for example by clicking and holding a mouse button or by touching the touchscreen in the respective area and moving the cursor or moving the user hand to a new location. While the moving of the display area is performed, the content displayed within the moving display area is displayed transparently.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to the type of content displayed within the display areas. The characteristics of the exemplary embodiments can be used in any combination. Although the present invention and its advantages have been described in detail, it should be understood, that various changes, substitutions and alterations can be made herein without departing from the spirit and scope of the invention as defined by the appended claims.

The invention claimed is:

1. A measuring device comprising:
    a processor;
    a display; and
    an input device; and
    wherein the processor is configured to control measurements of the measuring device, and to control the display to display a first content in a first display area and a second content in a second display area, wherein the first content consists of all content displayed in the first display area and the second content consists of all content displayed in the second display area,
    wherein the input device comprises a touchscreen device configured to receive a user input that controls a selection of one of the first display area and the second display area by touching the respective display area on the touchscreen device,
    wherein the processor is further configured to control the display to display all of the first content at least partially transparent when the first display area is selected, and to display all of the second content at least partially transparent when the second display area is selected,
    wherein the processor is further configured to modify a display order of the content of the selected display area relative to the content of the display area that is not selected,
    wherein the input device is further configured to detect a move-action indicating a user desire to move the selected display area on the display, and
    wherein the processor is further configured to move the selected display area on the display in response to the detection of the move-action, and to control the display to continue to display all of the first content at least partially transparent when the first display area is selected or all of the second content at least partially transparent when the second display area is selected while moving the selected display area on the display.

2. The measuring device according to claim 1, wherein the first display area and the second display area at least partially overlap, and wherein the processor is further configured to control the display to display the first content in front of the second content when the first display area is selected, and to display the second content in front of the first content when the second display area is selected.

3. The measuring device according to claim 1, wherein the input device further comprises one of a mouse, a trackball and a track-pad, and wherein the input device is further configured to receive a user input that controls the selection of one of the first display area and the second display area by moving a cursor on the display and actuating a control of the input device when the cursor is within the respective display area.

4. The measuring device according to claim 1, wherein the processor is further configured to,
    control the display to display the first content 30%-70% transparent if the first display area is selected, and
    control the display to display the second content 30%-70% transparent if the second display area is selected.

5. The measuring device according to claim 1, wherein the first content and the second content comprise one or more of control dialogs, measurement results, input parameters, measurement curves, output parameters, settings, and input curves.

6. A method comprising:
    controlling measurements of a measuring device;
    displaying, on a display of the measuring device, a first content in a first display area and a second content in a second display area, wherein the first content consists of all content displayed in the first display area and the second content consists of all content displayed in the second display area;
    receiving a user input, via a touchscreen device, that controls the selection of one of the first display area and the second display area by touching the respective display area on the touchscreen device;
    displaying all of the first content at least partially transparent when the first display area is selected, and displaying all of the second content at least partially transparent when the second display area is selected;
    modifying a display order of the content of the selected display area relative to the content of the display area that is not selected,
    detecting a move-action indicating a user desire to move the selected display area on the display;
    moving the selected display area on the display in response to the detection of the move-action; and
    displaying all of the first content at least partially transparent when the first display area is selected or all of the second content at least partially transparent when the second display area is selected while moving the selected display area on the display.

7. The method according to claim 6, wherein the first display area and the second display area at least partially overlap, and wherein the method further comprises:
    displaying the first content in front of the second content when the first display area is selected; and
    displaying the second content in front of the first content, when the second display area is selected.

8. The method according to claim 6, further comprising:
    receiving a user input, via a further input device, that controls the selection of one of the first display area and the second display area by moving a cursor on the display and actuating a control of the input device when the cursor is within the respective display area.

9. The method according to claim 6, further comprising:
    displaying the first content 30%-70% transparent, if the first display area is selected; and
    displaying the second content 30%-70% transparent, if the second display area is selected.

10. The method according to claim 6, wherein the first content and the second content comprise one or more of control dialogs, measurement results, input parameters, measurement curves, output parameters, settings, and input curves.

* * * * *